Nov. 28, 1961 O. V. JONES, JR 3,010,605
STOCK FEEDING APPARATUS
Filed April 4, 1958 4 Sheets-Sheet 4

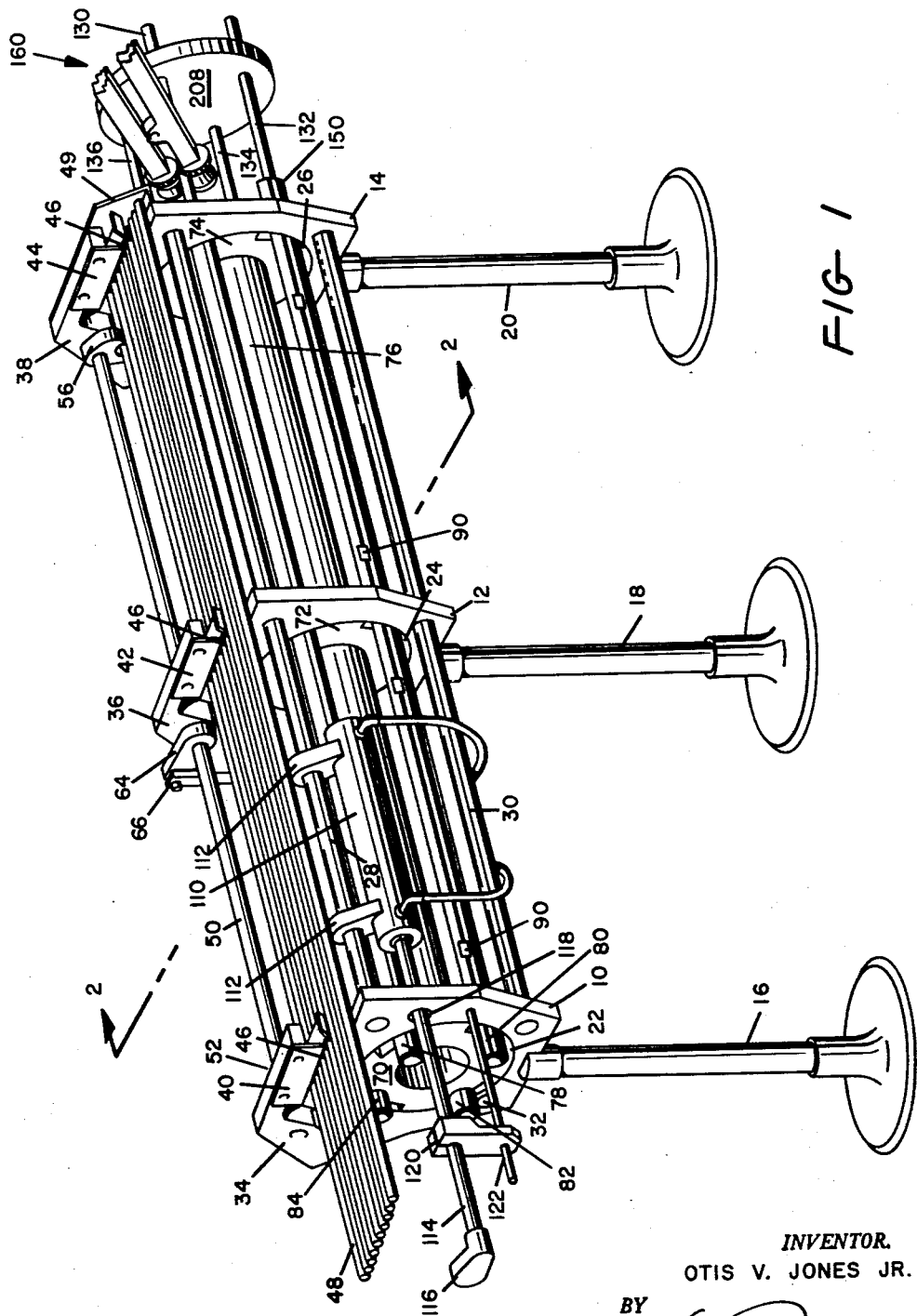

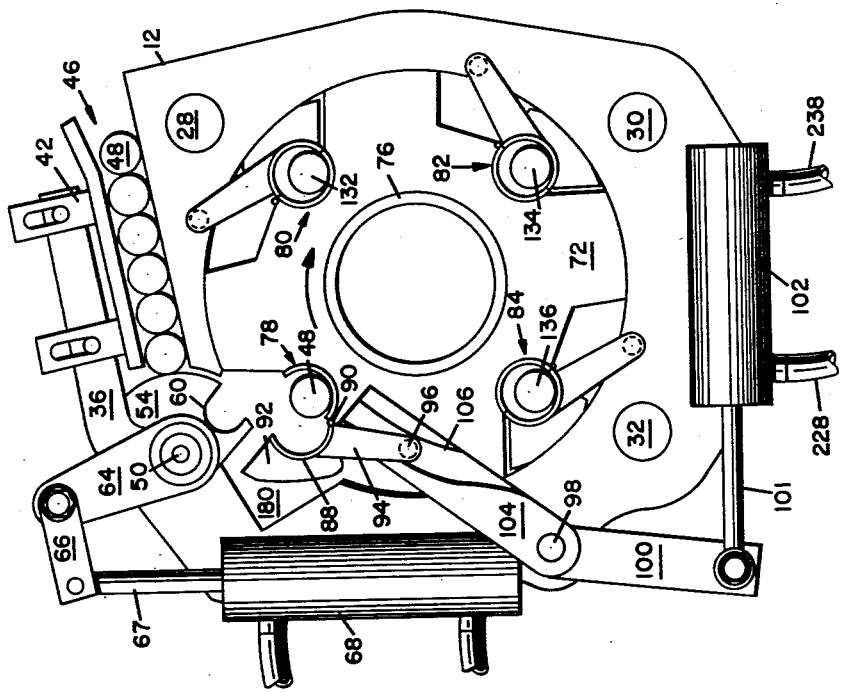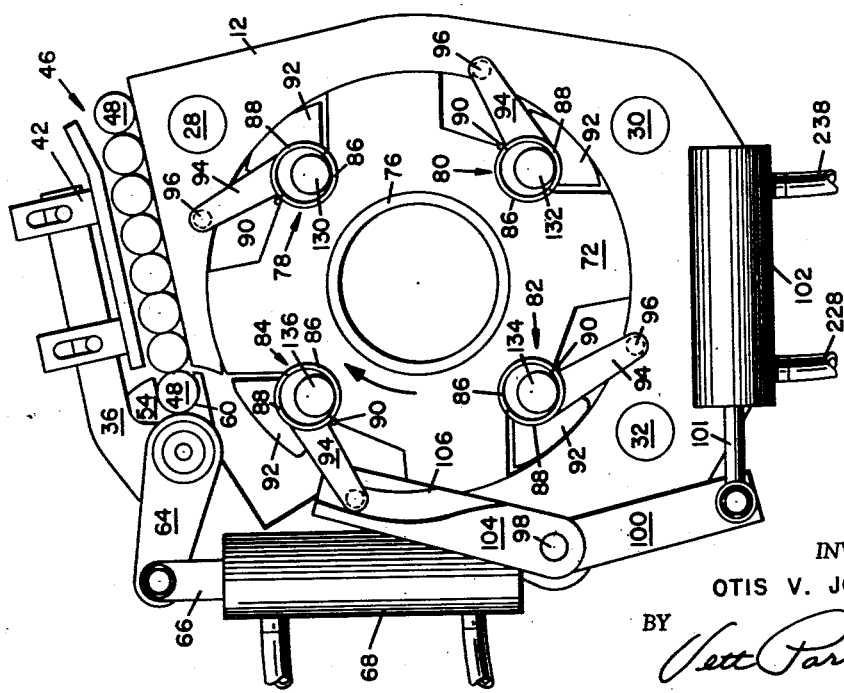

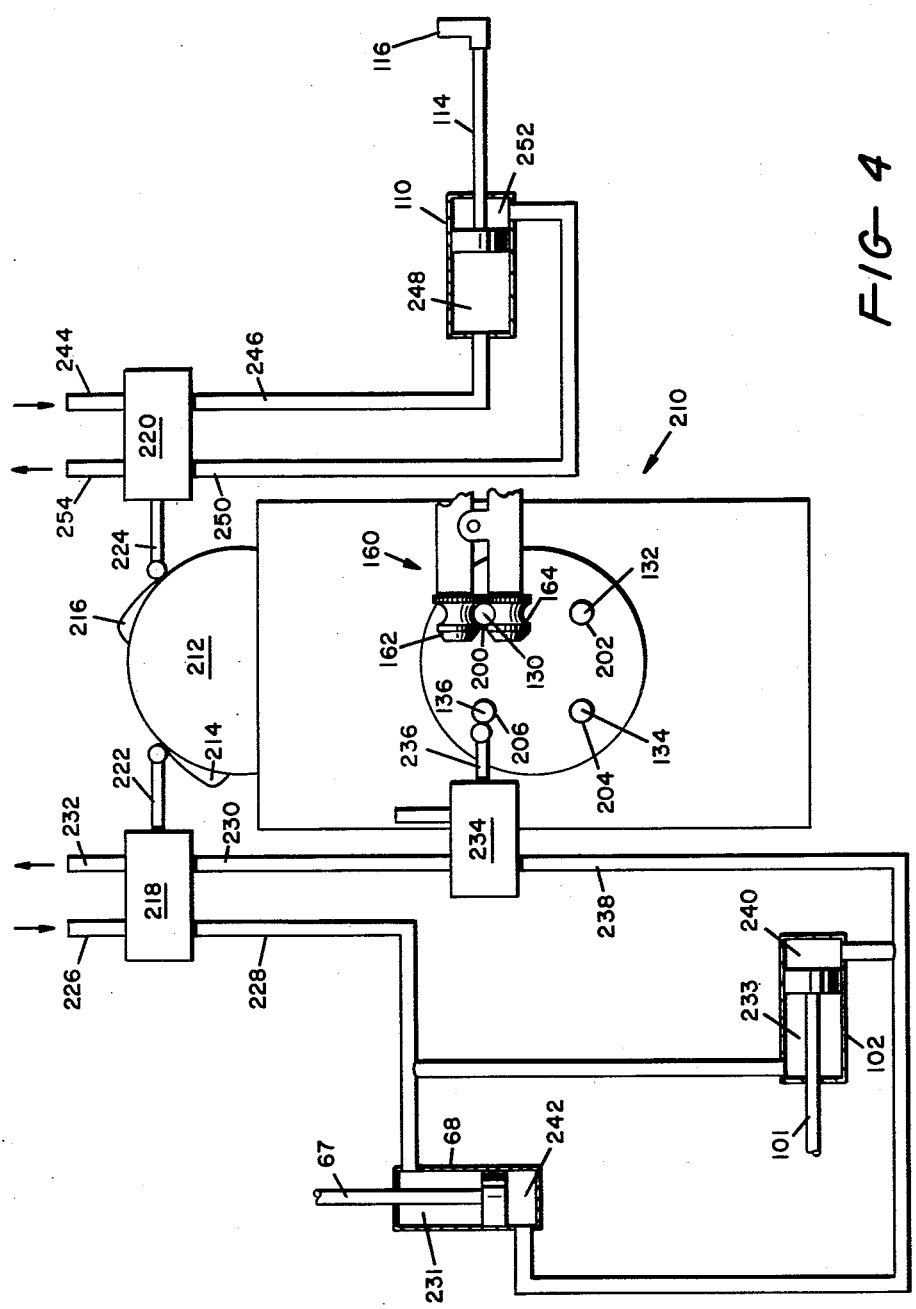

INVENTOR.
OTIS V. JONES JR.
BY
ATTORNEY

United States Patent Office 3,010,605
Patented Nov. 28, 1961

3,010,605
STOCK FEEDING APPARATUS
Otis V. Jones, Jr., 6028 Huron St., Dearborn, Mich.
Filed Apr. 4, 1958, Ser. No. 726,544
4 Claims. (Cl. 221—81)

This invention relates to automatic stock feeding apparatus for multiple spindle screw machines.

When a multiple spindle screw machine is used to cut bar stock into pieces of relatively great length, any length of bar stock fed to the machine is used up in a short period of time and consequently, the machine requires frequent reloading. If this reloading is done manually by a workman, the machine must be stopped each time the stock is used up in a spindle so that new stock may be introduced to it. Thus, the machine requires the constant attention of a workman and its production capacity is limited because of its frequent down time. To overcome these disadvantages, various types of automatic stock feeders have been built for reloading a multiple spindle screw machine without having to stop its operation.

This invention provides a new and improved automatic stock feeder. The feeder includes a plurality of hinged tubes supported in parallel relationship with respect to one another on a rotatable member or reel which is disposed to feed bar stock from the tubes to corresponding spindles in a multiple spindle screw machine. When the stock in any tube is used up, the feeder operates automatically to open the tube and to introduce new stock to it. Subsequently the tube is closed and the new stock is fed to the empty spindle without stopping the operation of the screw machine.

An object of this invention is to provide improved automatic stock feeding apparatus for screw machines.

Another object of the invention is to provide apparatus of the above character in which hinged tubes, when empty of stock, are automatically opened to receive new stock and then closed to retain the new stock.

Another object is to provide a stock feeder of the above character which is extremely simple to construct, relatively inexpensive to manufacture and reliable in its operation.

Other objects and advantages will become apparent from the following detailed description and from the appended drawings and claims.

In the drawings:

FIGURE 1 is a perspective view of an automatic stock feeder representing one embodiment of this invention.

FIGURE 2 is a cross sectional view taken substantially at 2—2 in FIGURE 1 in the normal position of the feeder.

FIGURE 3 is a cross sectional view taken again at substantially 2—2 in FIGURE 1 in the actuated position of the feeder.

FIGURE 4 is a diagram showing in schematic form how the various operations of the feeder are controlled.

Figure 6:
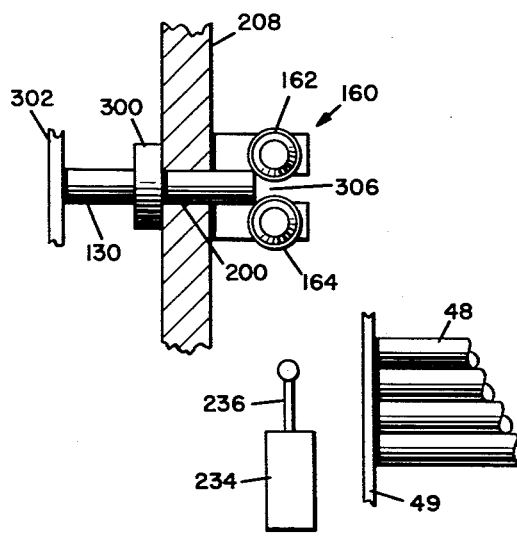
FIGURES 6 and 7 illustrate the manner in which stock may be fed to a spindle by the feeder shown in FIGURE 1.

In FIGURE 1, frame plates 10, 12 and 14 are supported on stands 16, 18 and 20 and are provided with annular openings 22, 24 and 26 which are aligned with respect to one another. Parallel rods 28, 30 and 32 are attached to the frame plates 10, 12 and 14 to maintain the plates in parallel relationship with respect to one another. Arms 34, 36 and 38 extending from the frame plates have brackets 40, 42 and 44 attached to them to form slots 46 for loading new bar stock 48. A stop plate 49 mounted on the plate 14 positions the ends of the stock 48 loaded into the slots 46.

A rod 50 is journalled through the arms 34, 36 and 38 for rotational movement within the arms and levers 52 (not shown), 54 and 56 are snugly retained on the rod. The levers 52, 54 and 56 are provided with grooves 60, which in the normal position of the rod 50 (FIG. 2) are aligned with the slots 46 to receive a single bar of stock 48 within the grooves.

A lever 64 (FIG. 2) is also snugly retained on the rod 50. A link 66 is pivotally connected to one end of the lever 64 and the other end of the link 66 is pivotally connected to a rod 67 of an air operated, piston-type linear actuator 68 which is mounted on the frame plate 12. The rod 67 is normally in its "in" position (FIG. 2) to maintain the grooves 60 aligned with the slots 46 and to prevent the stock 48 from dropping down. Upon actuation of the rod 67 into its "out" position (FIG. 3), the lever 64 is pivoted in a clockwise direction to produce a corresponding rotation of the rod 50. When this occurs, the levers 52, 54 and 56 are pivoted downward to drop a single piece of bar stock 48 while blocking the other pieces as shown in FIGURE 3.

Annular plates 70, 72 and 74 are disposed in the openings 22, 24 and 26, respectively, in the frame plates 10, 12 and 14 and are rotatable within the openings. A hollow, cylindrical member 76 connects the plates 70, 72 and 74 and maintains the plates in fixed relationship with respect to one another. Hinged tubes, generally indicated at 78, 80, 82 and 84 are also connected to the plates 70, 72 and 74 and are disposed in substantially parallel relationship to one another. Each tube consists of a first section 86 which is welded to the plates 70, 72 and 74 and a second section 88 which is connected to the section 86 by hinges 90. Flanges 92 welded to the sections 88 rest on the inner surface of the annular openings 22, 24 and 26 so as to maintain the sections 88 in their closed position with respect to the sections 86.

Pivoting arms 94 are welded to each section 88 adjacent to the plate 72. Protruding lugs 96 are provided at the end of each arm 94. A shaft 98 journalled into the frame plate 12 has a link 100 securely attached to it. The other end of the link 100 is pivotably connected to a rod 101 of a piston-type, linear actuator 102 mounted on the plate 12. Also, snugly retained on the shaft 98 is another link 104 provided with a curvilinear slot 106.

When the rod 101 is in its "in" position, the link 104 is maintained in the position shown in FIGURE 2 so that whenever a tube moves into the present position of the tube 84, the lug 96 of the tube enters the slot 106 and is retained in the slot. When the rod 101 is actuated to its "out" position as shown in FIGURE 3, the link 104 is moved in a clockwise direction to pivot open the tube 84 so as to receive new stock 48 which is dropped in the manner previously disclosed.

A piston type linear actuator 110 is mounted such as by brackets 112 on the rod 28. The rod 114 extending from the actuator is provided with a cap 116, which in the "out" position of the rod 114 (FIG. 1) is disposed externally of the ends of the new stock 48 in the slots 46. The rod 114 extends through an opening 118 in the plate 10 and through a bracket 120 supported by a rod 122 attached to the plate 10. Each time that a tube moves into the present position of the tube 78 (FIG. 2), the rod 114 is actuated into its "in" position so that the cap 116 engages the end of a newly fed piece of stock 48 and pushes it forward through the tube.

Figure 5:
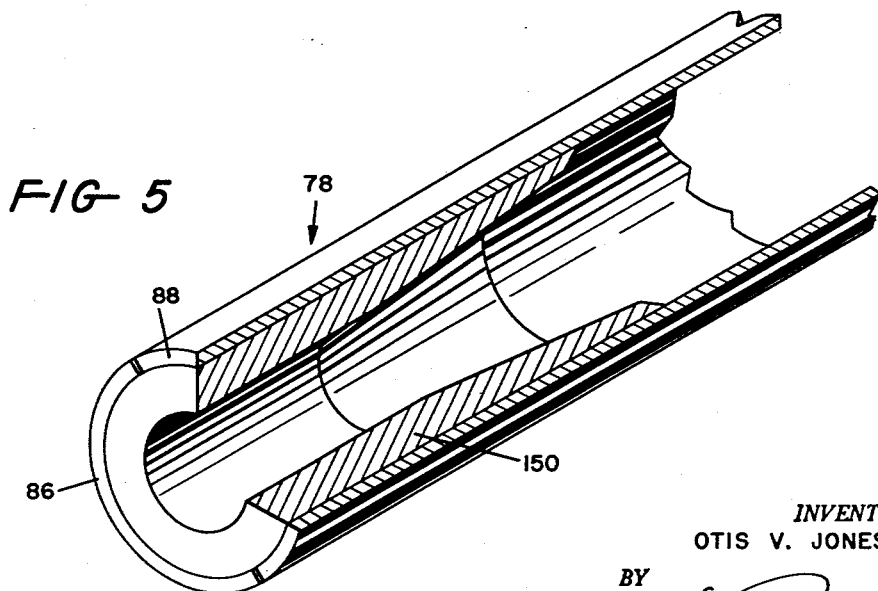
FIGURE 5 is an enlarged perspective view, partially broken away, of one of the components of the feeder in FIGURE 1.

Lengths of stock 130, 132, 134 and 136 initially fed automatically to the tubes 78, 80, 82 and 84, respectively, in a manner which will hereinafter be described in detail, are received through spindles 200, 202, 204 and 206 provided on a spindle carriage 208 of a multiple spindle screw machine generally indicated at 210. Tapered bushings 150 (FIG. 5) are attached to the sections 86 at the ends of each tube to guide the stock through the spindles in the screw machine. The bushings 150 may be easily replaced with bushings of different size to guide stock of different diameters.

A roller feed generally indicated at 160 is mounted on the machine 210 in the feed-out position of the machine. The operation of the roller feed 160 is fully disclosed in Patent No. 2,811,884 issued to me November 5, 1957. Each time a spindle indexes into the feed-out position of the machine, the rollers 162 and 164 of the roller feed 160 are moved into engagement with the stock in the spindle and are rotated to move the stock forward in the spindle. Subsequently, before the next indexing operation of the machine, the rollers 162 and 164 are moved out of engagement and away from the stock to permit the machine to index freely.

A cam drum 212 on the machine 210 makes one revolution between successive indexing operations of the machine to move tools (not shown) to cut the stock in the spindles. The drum 212 is provided with cams 214 and 216 displaced from each other in the axial direction of the drum.

Four way, spring loaded, roller cam operated, spool type valves 218 and 220, which are supported on the machine 210, are provided with roller arms 222 and 224 which are attached to the spools to displace the spools upon their movement. The roller arms 222 and 224 roll on the surface of the drum 212 and are aligned respectively with the cams 214 and 216. In the "out" position of the arm 222 (FIG. 4) air under pressure introduced to the inlet line 226 is channeled to the line 228 which introduces the air to the chambers 231 and 233 in the actuators 68 and 102 to maintain the rods in their "in" position.

During each revolution of the drum 212, the roller arm 222 is engaged and actuated into its "in" position by the cam 214. When this occurs, the air pressure is directed to the line 230 and the line 228 is connected to the exhaust line 232. The line 230 is connected to a three way, spring loaded, roller cam operated spool type valve 234 having a roller arm 236 for displacing the spool in the valve. The valve 234 is normally open in the "out" position of the arm 236. The roller arm 236 is positioned between the stop 49 and the rollers 162 and 164 of the roller feed 160. The stock 136 engages the arm 236 and displaces it into its "in" position to close the valve, thus blocking the passage of air from the line 230 to the line 238 and to the chambers 240 and 242 in the actuators 102 and 68. Thus the rods 101 and 67 are maintained in their "in" position whenever stock is present in the position of stock 136 (FIG. 4). When stock in this position is exhausted, the roller arm 236 remains in its "out" position because of the spring load, thus leaving open the valve 234 to connect the line 230 to the line 238 for introducing air to the chambers 240 and 242 so as to actuate the rods 101 and 67 into their "out" position.

In the "out" position of the roller arm 224 of the valve 220, air pressure at its inlet line 244 is channeled to the line 246 and to the chamber 248 in the actuator 110 to maintain the rod 114 in its "out" position. However, during each revolution of the drum 212, the roller arm 224 is engaged and actuated into its "in" position by the cam 216. This causes the air pressure in the line 244 to be channeled to the line 250 and to the chamber 252 for actuating the rod 114 into its "in" position. In this position the line 246 is connected to exhaust line 254 so as to remove air from the chamber 248.

The operation of the feeding apparatus described above is as follows. When the spindle carriage 208 is first indexed in a clockwise direction to the position shown in FIGURE 4, the rotation of the drum 212 causes tools (not shown) to move in to perform a machining operation on the stock 132, 134 and 136 in the spindles 202, 204 and 206 and to cut off a section of stock 130 in the spindle 200 which is in the feed-out position of screw machine 210.

After the section of stock 130 has been cut off and dropped by the machine into a container (not shown) the collet 300 (FIG. 6) in the spindle 200 is released and rollers 162 and 164 operate to feed the stock 130 through the collet 300 until it reaches the stop 302. Then the collet 300 is again clamped on the stock 130 to retain it firmly so that the spindle can rotate the stock for subsequent machining operations and the rollers 162 and 160 are moved out of engagement and away from the stock 130 to permit the machine to index freely in a clockwise direction.

Upon indexing of the machine, the spindles 200, 202, 204 and 206 move respectively into the positions of the spindles 202, 204, 206 and 200 shown in FIGURE 4. This causes a corresponding movement of the stock 130, 132, 134 and 136 and also a corresponding movement of the tubes 78, 80, 82 and 84 which are engaged by the stock to rotate the plates 70, 72 and 74 in the annular openings 22, 24 and 26 which may be greased to facilitate the rotation of the plates. When the machine has indexed, the rollers 162 and 164 are moved into engagement with the stock 136 to subsequently feed the stock forward through the spindle 206.

Immediately after the machine indexes, the roller arm 222 of the valve 218 is engaged by the cam 214 to actuate the arm 222 into its "in" position, thereby connecting the air supply line 226 to the line 230. Since the stock 134 now engages the roller arm 236 and retains it in its "in" position the valve 234 remains closed. Therefore, the air is blocked from the line 238 and from the chambers 240 and 242 to maintain the rods 101 and 67 in their "in" position as shown in FIGURE 4. Thus, whenever stock is present to engage the roller arm 236, the feeding apparatus is not actuated to feed new stock to one of the tubes 78, 80, 82 and 84.

At substantially the same time that the roller arm 222 is engaged by the cam 214, the roller arm 224 is engaged by and is actuated into its "in" position by the cam 216 thereby connecting the air supply line 244 and the line 250. The resultant air introduced into the chamber 252 causes the rod 114 to be actuated into its "in" position while the air in the chamber 248 is exhausted through the lines 246 and 254. The movement of the rod 114 into its "in" position also produces a corresponding inward movement of the cap 116 which, if new stock had been introduced to the tube 84 before indexing, would engage the end of the stock and push it through the rollers 162 and 164.

As the drum 212 continues to rotate, the roller arms 222 and 224 leave the cams 214 and 216 and are spring returned to their "out" positions with the rollers engaging the surface of the drum 212. In the "out" position of the roller arm 222, the air is again connected to the line 228 and introduced to the chambers 231 and 233 to maintain the rods 67 and 101 in their "in" position. In the "out" position of the roller 224 the air is again connected to the line 246, thus introducing air to the chamber 248 to return the rod 114 and the cap 116 to their "out" positions.

Before the machine indexes again, the tools perform a machining operation on the stock 130, 132 and 134 and a section of stock is cut off from the stock 136 and the rollers 162 and 164 operate to feed the stock 136 forward to the stop 302 in readiness for the next sequence of machining operations. Then after the rollers 162 and 164 are moved away from the stock 136, the carriage 208 indexes once more to position the spindles 204, 206, 200 and 202 respectively in the positions of the spindles 200, 202, 204 and 206 as shown in FIGURE 4 and the operation described above is repeated until the stock in one of the tubes 78, 80, 82 or 84 is exhausted.

Starting with the spindle 200 in the feed-out position of the machine 210 as shown in FIGURE 4, with stock 130 being fed to the spindle 200 from the tube 78 (FIG. 2), let us assume that the end 306 of the stock 130 has passed through the rollers 162 and 164 as shown in FIGURE 6 and is, therefore, positioned past the stop 49 and the roller arm 236 after a section of the stock 130 has been cut off and dropped and the stock has been pushed forward to the stop 302 by the rollers 162 and 164 as previously described. The machine 210 will then continue to operate as previously described.

After the machine has indexed three times to position the spindle 200 in the position of the spindle 206 in FIGURE 4, the roller arm 236 cannot engage the stock 130 since the end 306 is positioned past the arm. This causes the roller arm 236 to remain in its "out" position and the valve 234 stays open. Consequently when the roller arm 222 is actuated by the cam 214, the line 226 connects to the line 230 and since the valve 234 is now open, the line 230 connects to the line 238 to introduce air to the chambers 240 and 242 to actuate the rods 101 and 67 simultaneously into their "out" positions.

When this occurs, as is illustrated in FIGURE 3, the link 104 moves in a clockwise direction to pivot open the section 88 of the tube 78. It will be noted that the arm 36 of the plate 12 is provided with a cut out portion 180 to permit the pivotal movement of the section 88 and the flange 92 within the cut out portion. Similar cut out portions 180 are provided in the arms 34 and 38 of the plates 10 and 14.

Simultaneously with the opening of the tube 78, the shaft 50 is rotated in a clockwise direction by the link 64 so as to move the levers 52, 54 and 56 downward so as to drop a single piece of new stock 48 into the tube 78. As the drum 212 continues to rotate the roller 222 is released from the cam 214 thus returning the arm to its "out" position and switching the air pressure from the line 226 to the line 228. This causes the introduction of air pressure to the chambers 231 and 233 to move the rods 101 and 67 back to their "in" position. When this occurs the tube 78 is again closed and the levers 52, 54 and 56 are returned to their normal position with the grooves 60 aligned with another new stock 48. When the machine indexes again the lug 96 is retained within the slot 106 until the flanges 92 move past the open portions 180 and into contact with the inner surface of the annular openings 22, 24 and 26. In this way, the section 88 of the tube 78 is prevented from pivoting open accidently while the tube moves past the open portion 180.

Figure 7:
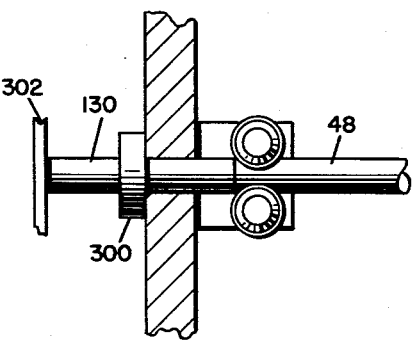

After the machine 210 has indexed, the spindle 200 returns to the feed-out position of the machine with newly fed stock 48 in the tube 78 being aligned with the spindle. During rotation of the drum 212, the roller arm 224 is actuated by the cam 216 to move the rod 114 and the cap 116 into their "in" position. The cap 116 engages the end of the new stock 48 and pushes it through the rollers 162 and 164 into contact with the end 306 of the stock 130 as shown in FIGURE 7. Subsequently, the rod 114 is returned to its "out" position when the roller arm 224 leaves the cam 216.

Then after another section of the stock 130 is cut off and the collet 300 is released, the rollers 162 and 164 operate to move forward the new stock which pushes the old stock 130 to the stop 302. Then the collet clamps on the stock 130 and the machine indexes through a complete cycle to return the spindle to the feed-out position. In this position, another section of the stock 130 is cut off and the rollers 162 and 164 again feed forward the new stock 48. If sufficient stock 130 is not left to reach the stop 302, the remaining short section passes through the collet 300 and drops down while the new stock 48 continues to move forward until it reaches the stop 302. Then the collet 300 clamps on the new stock and thus the spindle 200 is reloaded for continued operation of the machine.

Whenever stock is exhausted from any of the tubes 78, 80, 82 and 84, they are reloaded in the manner described above to continue the operation of the screw machine without having to stop it for reloading. Each tube when closed confines the stock in the tube, thus allowing the stock to rotate in its spindle with safety.

Although the feeding apparatus has been described as used with a multiple spindle screw machine, it will be evident to persons skilled in the art that a single hinged tube may be operated in a similar manner to feed a single spindle screw machine. In such case the single tube would be stationary and aligned with the single spindle. The tube would be pivoted open and stock fed to it each time that old stock is exhausted.

Although the feeding apparatus has been shown feeding stock through the rollers 162 and 164 which in turn feed the stock through a spindle of a multiple spindle screw machine without the use of feed fingers, the introduction of the stock may be handled in other ways as would be evident to persons skilled in the art. For example, instead of using the rollers 162 and 164, it would be possible to reload a spindle using the rod 114 and cap 116 to push new stock through the feed fingers normally provided in the spindles.

Also, a spindle may be loaded by using both the feed fingers and the rollers 162 and 164. In this case, the stop 49 and the roller arm 236 would be moved closer to the carriage 208 so that any new stock introduced to an empty tube and subsequently indexed into the feed out position would be positioned such that the rollers 162 and 164 would engage the new stock when they are pivoted into contact with the stock. In this way, the rollers 162 and 164 would operate to feed the new stock through the feed fingers without any need for the push rod 114 and cap 116.

There would be considerable advantage in using a combination roller feed and feed fingers in that the stock would be fed from the front end and it would, therefore, be possible to use different lengths of stock in the slots 46. This would not be possible in the use of the push rod 114 since stock cannot extend beyond the cap 116 for it to operate. Use of stock of different lengths could involve a considerable savings since stock of random lengths can be purchased for considerably less than stock of substantially uniform length as is required when a push rod 114 is necessary.

Although this invention has been disclosed and illustrated with reference to particular applications, the principles involved are susceptible of numerous other applications which will be apparent to persons skilled in the art. The invention is, therefore, to be limited only as indicated by the scope of the appended claims.

What is claimed is:

1. Stock feeding apparatus for a machine having an indexible carriage and a plurality of spindles in the carriage, including a reel, a plurality of tubes mounted on the reel in parallel relationship to one another, each tube being aligned with a corresponding spindle in the carriage to enclose the bar stock supported in the spindle, means to produce, upon indexing of the carriage a corresponding indexing movement of the tubes and the reel each tube consisting of a first section attached to the reel and a second section pivotably connected to the first section so that the second section may be pivoted relative to the first section to open the tube, a magazine supported adjacent to the reel and loaded with bar stock, a rotatable rod supported in parallel relationship to the tubes, a lever arm rotatable with the rod, the arm being provided with a groove aligned with the magazine to retain in the groove a single piece of bar stock from the magazine, and means operative, when the bar stock in a particular tube is exhausted and the tube is indexed to a position directly below the lever arm, to pivot the second section relative to the first section to open the tube and to rotate the rod and lever arm for dropping the bar stock retained in the groove into the tube, said means being operative, prior to the next indexing operation, to close the tube and to return the lever arm to its normal position aligning the groove with the magazine to receive in the groove another piece of bar stock.

2. Stock feeding apparatus for a machine having an indexible carriage and a plurality of spindles in the carriage, including a reel, a plurality of tubes mounted on the reel in parallel relationship to one another, each tube being aligned with a corresponding spindle in the carriage to enclose the bar stock supported in the spindle, means to produce, upon indexing of the carriage, a corresponding indexing movement of the tubes and the reel, each tube consisting of a first section attached to the reel and a second section pivotably connected to the first section so that the second section may be pivoted relative to the first section to open the tube, a magazine supported adjacent to the reel and loaded with bar stock, a rotatable rod supported in parallel relationship to the tubes, a lever arm rotatable with the rod, the arm being provided with a groove aligned with the magazine to retain in the groove a single piece of bar stock from the magazine, first means operative, when the bar stock in a particular tube is exhausted and the tube is indexed to a position directly below the lever arm, to pivot the second section relative to the first section to open the tube and to rotate the rod and lever arm for dropping the bar stock retained in the groove into the tube, said first means being operative, prior to the next indexing operation, to close the tube and to return the lever arm to its normal position aligning the groove with the magazine to receive in the groove another piece of bar stock, and second means operative, after the next indexing operation of the carriage, to push the new stock forward through the tube in the direction of its corresponding spindle.

3. Stock feeding apparatus as recited in claim 2 wherein the first means for pivoting open the tube includes, an arm connected to the second section of each tube, a lug at the end of each arm, a link pivotably supported and provided with a slot positioned to receive the lug each time a tube is indexed into a position adjacent to the link, and an actuator connected to the link and operative when the stock in the tube is exhausted to pivot the link so as to move the lug and its arm in a direction to open the tube.

4. Stock feeding apparatus as recited in claim 1 wherein the means for pivoting open the tube includes, an arm connected to the second section of each tube, a lug at the end of each arm, a link pivotably supported and provided with a slot positioned to receive the lug each time a tube is indexed into a position adjacent to the link, and an actuator connected to the link and operative when the stock in the tube is exhausted to pivot the link so as to move the lug and its arm in a direction to open the tube.

References Cited in the file of this patent

UNITED STATES PATENTS

| 2,320,039 | Jobert | May 25, 1943 |
| 2,577,203 | Mariotte | Dec. 4, 1951 |
| 2,746,128 | Barron | May 22, 1956 |
| 2,781,574 | Harney | Feb. 19, 1957 |
| 2,811,884 | Jones | Nov. 5, 1957 |

FOREIGN PATENTS

| 492,252 | Great Britain | Sept. 16, 1938 |